United States Patent
Sandi

(10) Patent No.: US 11,180,320 B2
(45) Date of Patent: Nov. 23, 2021

(54) ENCLOSED CONVEYOR

(71) Applicant: TMSA - TECNOLOGIA EM MOVIMENTAÇÃO S.A., Porto Alegre (BR)

(72) Inventor: Irani Antonio Sandi, Porto Alegre (BR)

(73) Assignee: TMSA—Tecnologia em Movimentação S.A., Porto Alegre (BR)

( * ) Notice: Subject to any disclaimer, the term of this patent is extended or adjusted under 35 U.S.C. 154(b) by 0 days.

(21) Appl. No.: 16/980,672

(22) PCT Filed: Mar. 14, 2019

(86) PCT No.: PCT/BR2019/000011
§ 371 (c)(1),
(2) Date: Sep. 14, 2020

(87) PCT Pub. No.: WO2019/173887
PCT Pub. Date: Sep. 19, 2019

(65) Prior Publication Data
US 2021/0016972 A1 Jan. 21, 2021

(30) Foreign Application Priority Data

Mar. 15, 2018 (BR) .................... BR102018005203-9
Mar. 6, 2019 (BR) .................... BR102019004398-9

(51) Int. Cl.
*B65G 15/08* (2006.01)
*B65G 15/06* (2006.01)
(Continued)

(52) U.S. Cl.
CPC ............. *B65G 15/08* (2013.01); *B65G 15/06* (2013.01); *B65G 21/08* (2013.01); *B65G 39/125* (2013.01);
(Continued)

(58) Field of Classification Search
CPC ........ B65G 15/08; B65G 15/06; B65G 21/08; B65G 2812/02108; B65G 39/12; B65G 39/125; B65G 39/14; B65G 39/145
See application file for complete search history.

(56) References Cited

U.S. PATENT DOCUMENTS 2,249,588 A * 7/1941 Waddle .................. B65G 43/00
198/493
3,809,211 A * 5/1974 Padilla .................. B65G 45/14
198/501
(Continued)

FOREIGN PATENT DOCUMENTS

WO WO-2020012142 A1 * 1/2020 ............. A01K 63/10

OTHER PUBLICATIONS

International Search Report & Written Opinion for PCT/BR2019/000011, dated Jun. 13, 2019.

*Primary Examiner* — Mark A Deuble
(74) *Attorney, Agent, or Firm* — Piloff Passino & Cosenza LLP; Sean A. Passino; Rachel K. Piloff

(57) ABSTRACT

This invention refers to an enclosed conveyor (10) of bulk material (100) comprising an enclosure (20) and provided within said enclosure (20) with a conveyor belt (30) arranged over a set of rollers (40). More particularly, the invention relates to an enclosure (20) capable of improving the manufacturing process of the enclosed conveyor (10). The enclosed conveyor (10) comprises an enclosure (20) formed by a first side wall (21) and a second side wall (22) arranged over a bottom plate (23) and provided with a cover (24) disposed over said side walls (21, 22). The enclosed conveyor (10) comprises at least one set of rollers (40) comprising a first inclined roller (41) mounted on the first side wall (21) and a second inclined roller (42) mounted on the second side wall (22), and a conveyor belt (30) arranged over the set of rollers (40). According to the invention, each (Continued)

side wall (21, 22) comprises a respective vertical section (211, 221) arranged over the bottom plate (23) and a respective support section (212, 222) inclined inwardly of the enclosure (20), each support section (212, 222) being inclined along an entire longitudinal extension of the respective side wall (21, 22), the first inclined roller (41) being mounted on at least part of the support section (212) of the first side wall (21) and the second inclined roller (42) being mounted in at least part of the support section (222) of the second side wall (22). Thus, with the support sections (212, 222) inclined across all the longitudinal extension of the side walls (21, 22), the manufacturing process of the enclosed conveyor (10) becomes easier and cheaper when compared to the manufacture of a conventional enclosed conveyor.

16 Claims, 11 Drawing Sheets

(51) Int. Cl.
*B65G 21/08* (2006.01)
*B65G 39/14* (2006.01)
*B65G 39/12* (2006.01)

(52) U.S. Cl.
CPC ........... *B65G 39/14* (2013.01); *B65G 39/145* (2013.01); *B65G 2812/02108* (2013.01)

(56) References Cited

U.S. PATENT DOCUMENTS

| | | | | |
|---|---|---|---|---|
| 3,878,936 | A * | 4/1975 | Niggemyer | B65G 21/08 198/860.2 |
| 4,402,395 | A * | 9/1983 | Hashimoto | B65G 15/08 198/807 |
| 6,044,965 | A | 4/2000 | Clark | |
| 6,155,407 | A * | 12/2000 | Shelstad | B65G 21/2081 198/525 |
| 8,225,926 | B1 | 7/2012 | Anderson et al. | |
| 10,246,265 | B2 * | 4/2019 | Schnitkey | B65G 39/12 |
| 2002/0063042 | A1 * | 5/2002 | Fischer | B65G 39/125 198/826 |
| 2018/0346253 | A1 * | 12/2018 | Kahrger | B65G 23/12 |
| 2020/0071080 | A1 * | 3/2020 | Wood | B65G 15/08 |

* cited by examiner

ENCLOSED CONVEYOR

FIELD OF THE INVENTION

This invention refers to a bulk material enclosed conveyor comprising a enclosure and provided within said enclosure with a conveyor belt arranged on a set of rollers. More particularly, the invention relates to an enclosure capable of improving the manufacturing process of an enclosed conveyor.

BACKGROUND OF THE INVENTION

Currently, enclosed conveyors used to convey bulk materials such as grains, pellets or wood chips, by means of a conveyor belt arranged on a set of rollers are already known. In a typical configuration, the conveyor belt is protected from adverse weather conditions by means of an enclosure, formed by a plurality of modules of different lengths and comprised with side walls mounted on a bottom plate and a cover arranged above said side walls.

A conventional enclosed conveyor configuration can be found in patent document U.S. Pat. No. 8,225,926B1, where a conventional enclosed conveyor comprising a conventional enclosure is disclosed, with the interior of said conventional enclosure being provided with a conveyor belt arranged on a plurality of sets of rollers, each set of rollers being comprised by two side rollers and a horizontal roller.

It is noted that the conventional enclosed conveyor is formed by a plurality of modules along its longitudinal extension, and that each module is provided with a plurality of sets of rollers.

In particular, the pillow blocks responsible for supporting the side rollers of the conventional enclosed conveyor are mounted in compartments located outside of the conventional enclosure and intended to support said pillow blocks in the side walls of said conveyor in an inclined manner. In another known embodiment, it is also possible to use sealed pillow blocks inside of the rollers that support the conveyor belt, while the shafts of said rollers are fixed on the side walls of the conventional enclosure.

The compartments of the conventional enclosed conveyor are comprised of receptacles that allow the shafts of the side rollers to pass out of the conventional enclosure through a hole and allow the assembly of the pillow blocks of said side rollers to be carried out outside said conventional enclosure.

Thus, even with the use of pillow blocks in compartments and with the use of rollers with sealed internal pillow blocks, the bearings of said pillow blocks are not immersed in the internal atmosphere of the conventional enclosed conveyor contaminated by dust from the movement of the transported product. This characteristic is particularly advantageous, as the dust from the movement of the transported bulk material can, in certain situations, ignite due to the overheating of a defective bearing.

Technical Problem

However, conventional enclosed conveyors with inclined rollers fixed to the side walls have drawbacks related to their manufacture. Currently, the compartments where the pillow blocks of inclined rollers are mounted must be welded to the side walls of the conventional enclosure. In addition, the compartments themselves are manufactured by welding metal sheets cut to a specific size to form a receptacle capable of receiving the pillow blocks.

Thus, in view of the number of sets of rollers of a conventional enclosed conveyor, and that each set of rollers comprises two inclined rollers, the manufacturing process of said enclosed conveyor becomes time-consuming and burdensome.

In addition, in the way the conventional enclosed conveyor is currently constructed, it is necessary to use upper crossbars in the upper portion of the conventional enclosure where a conventional cover is arranged to guarantee the structural stability of said conventional enclosure.

In this way, the feeding of the bulk material to be transported is jeopardized, since the upper crossbars act as obstacles that interfere with the feeding of said bulk material, so that a crane responsible for said feeding must deviate from said upper crossbars.

SUMMARY OF THE INVENTION

In order to solve the drawbacks of the state of the art, the present invention proposes an enclosed conveyor comprising an enclosure formed by a first side wall and a second side wall arranged over a bottom plate and provided with a cover arranged over said side walls. The enclosed conveyor of the present invention also comprises at least one set of rollers comprising a first inclined roller mounted on the first side wall and a second inclined roller mounted on the second side wall, and a conveyor belt arranged over the set of rollers.

According to the invention, each side wall comprises a respective vertical section disposed over the bottom plate and a respective support section inclined inwardly of the enclosure, each support section being inclined all along an entire longitudinal extension of the respective side wall, the the first inclined roller being mounted on at least part of the support section of the first side wall and the second inclined roller being mounted on at least part of the supporting section of the second side wall.

Notice that in the conventional enclosed conveyor the support section of an inclined roller is comprised by the face of the compartment that supports said inclined roller.

Advantageously, the side walls of the enclosed conveyor as proposed by the present invention comprise the support sections inclined all along the longitudinal extension of the side walls in order to make the process of manufacturing said enclosed conveyor easier and cheaper compared to the conventional enclosed conveyor.

Due to the arrangement of the inclined support section along all the longitudinal extension of the side walls, it is possible to manufacture said side walls, provided with support sections that cooperate with the shafts of all inclined rollers of an enclosed conveyor module, by means of a single forming process.

Thus, in a single bending step of a metal sheet that forms one of the side walls of one of the enclosed conveyor modules, the support section is in all positions necessary for mounting the pillow blocks in one of the enclosed conveyor modules.

Thus, it is no longer necessary to manufacture the welded compartments for mounting the pillow blocks in an inclined manner, nor to weld said compartments on the side walls of a conventional enclosed conveyor, saving time and resources in the manufacture of said conveyor.

In a shown embodiment, the enclosed conveyor comprises a horizontal beam with each end fixed in a vertical section of the side walls, said horizontal beam being disposed between the conveyor belt and the bottom plate of the enclosure.

Thus, the horizontal beam has the function of ensuring the structural stability of the enclosure in the vertical sections of the side walls. Therefore, it is guaranteed that the enclosure does not suffer deformations or buckling by applying the loads inherent in the transport of the bulk material to be transported in the region of the vertical sections of the side walls.

Furthermore, the enclosed conveyor may comprise a plurality of inclined beams, one end of said inclined beams being fixed to one of the supporting sections of a side wall and with another end fixed to the horizontal beam.

Notice that the inclined beams acts along with the horizontal beam to guarantee the structural stability of the enclosure in the support section of the side walls, preventing deformations from occurring in the enclosure above the vertical sections.

Advantageously, in addition to ensuring the structural stability of the enclosed conveyor enclosure, the use of the horizontal beam along with the inclined beams allows the enclosed conveyor to be devoid of any reinforcement in the upper portion of said enclosure where the cover is arranged.

In this way, it becomes possible to feed bulk material to be transported to the enclosed conveyor at any point on the conveyor belt, without interfering with any obstacle, facilitating said feeding operation.

BRIEF DESCRIPTION OF THE DRAWING

The invention shall be better understood with the following detailed description, which shall be better interpreted with the help of the figures, namely.

DETAILED DESCRIPTION OF THE INVENTION

An enclosed conveyor (10) as proposed by the present invention is comprised of a plurality of interconnectable modules at its ends by means of screwed connections, in order to allow an adjustment of the length of said enclosed conveyor (10) by the number of modules according to the desired application. The modules of the enclosed conveyor (10) can have different lengths, but are equipped with the same components, therefore, only one module will be described in detail in this specification.

Figure 1:
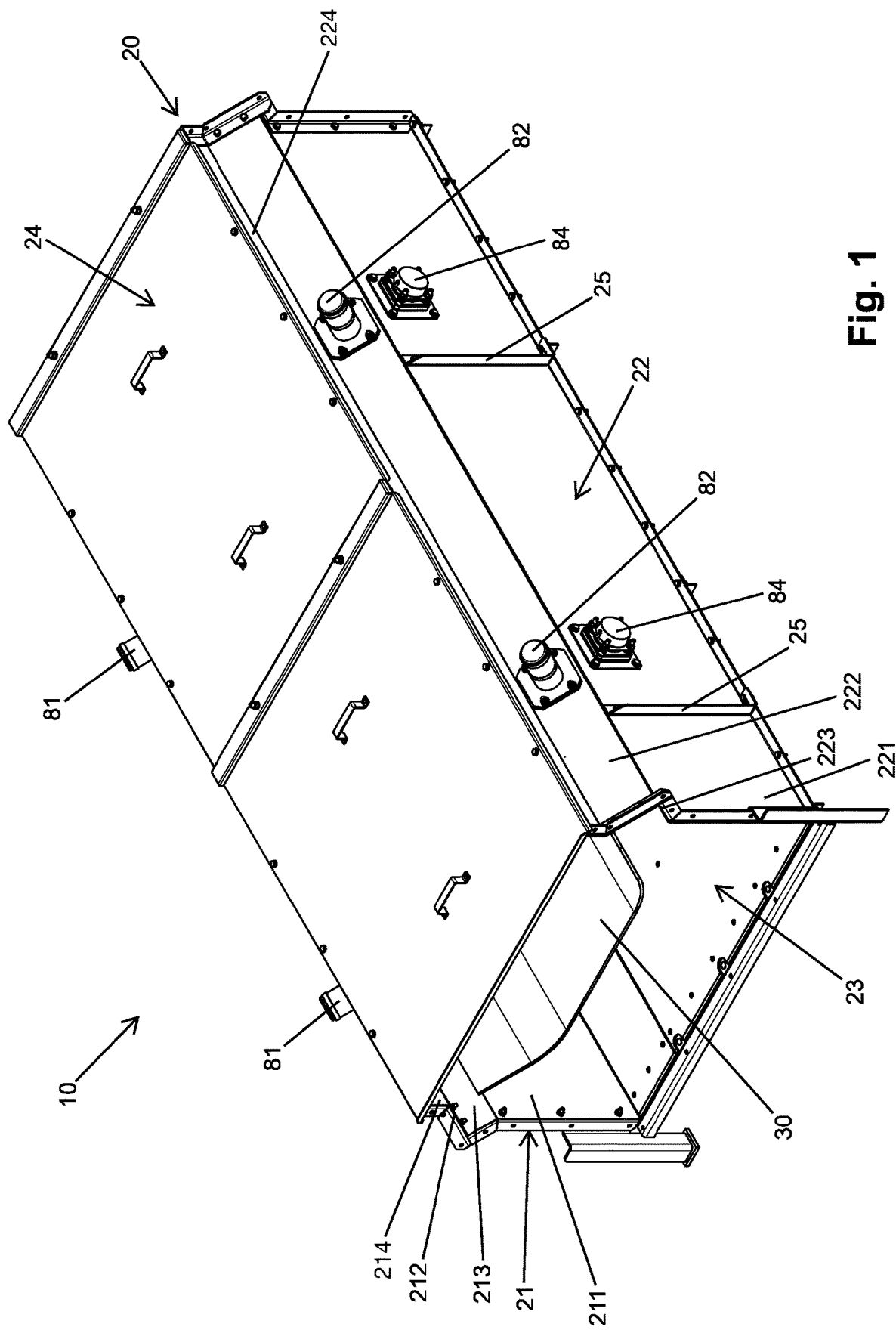
FIG. 1 shows a perspective view of an enclosed conveyor according to a first embodiment of the invention.
Figure 5:
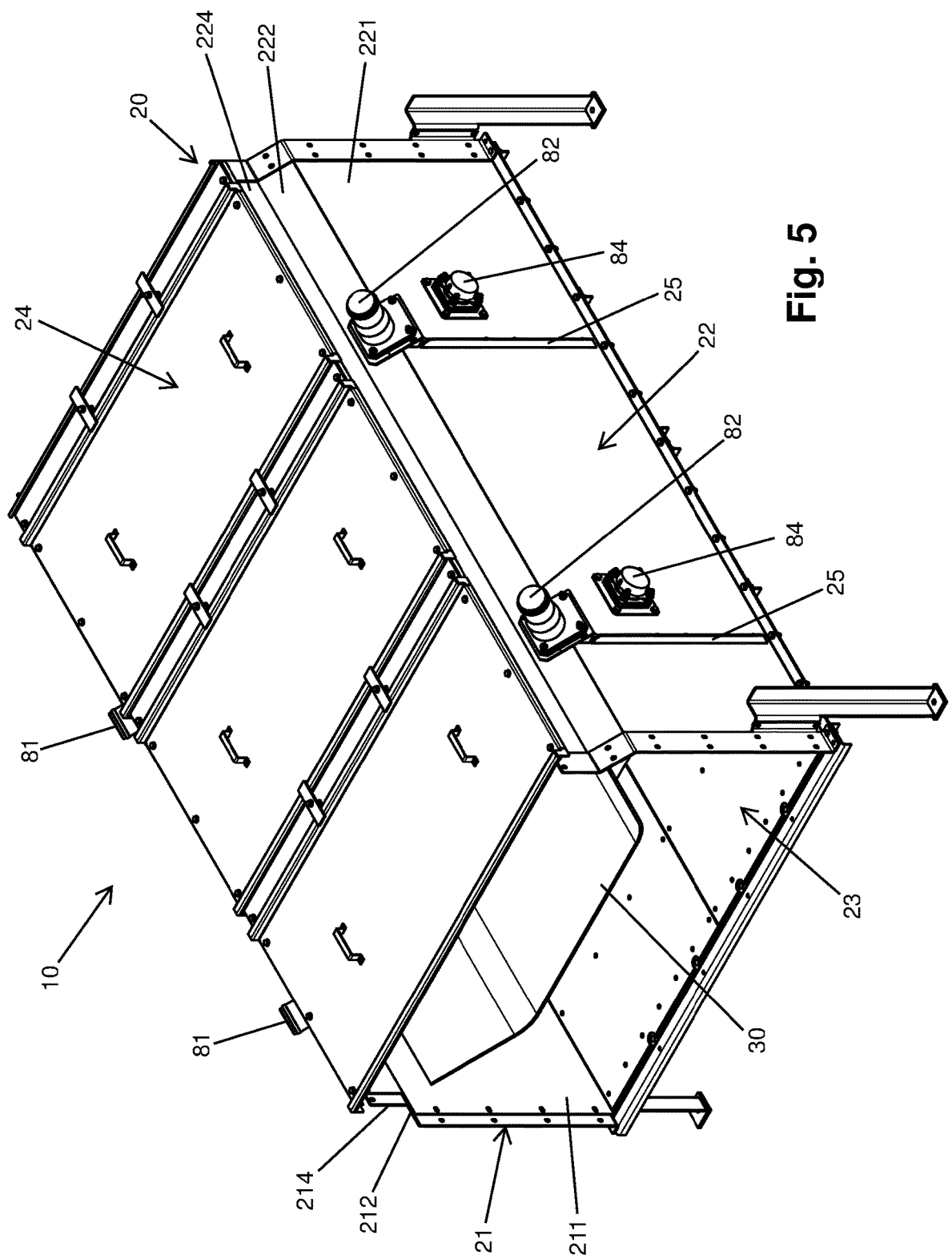
FIG. 5 shows a perspective view of an enclosed conveyor according to a first embodiment of the invention.
Figure 6:
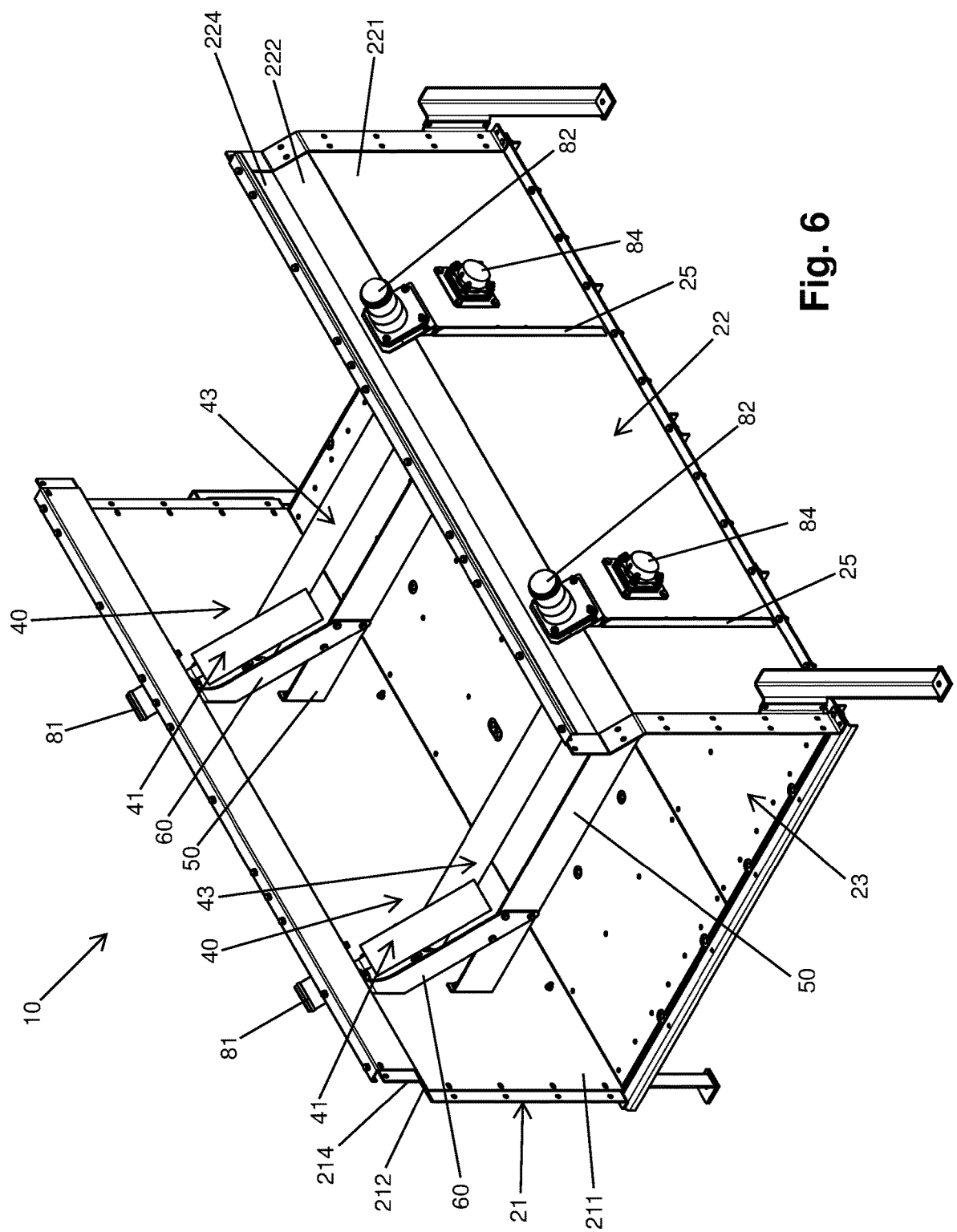
FIG. 6 shows a perspective view of the enclosed conveyor of the second embodiment of the invention without the representation of a cover and a conveyor belt.

According to FIGS. 1 and 5, the enclosed conveyor (10) of the present invention comprises an enclosure (20) formed by a first side wall (21) and a second side wall (22) arranged over a bottom plate (23) and is provided with a cover (24) disposed over said side walls (21, 22).

In the embodiments shown, the first side wall (21) is mounted over one side of the bottom plate (23), while a second side wall (22) is arranged over the opposite side of said bottom plate (23). The side walls (21, 22) are mounted next to the bottom plate (23) by means of a screw connection. Likewise, the cover (24) is also screwed onto the side walls (21, 22).

In the embodiment shown in FIG. 1, the cover (24) is comprised of two separate components, while in the embodiment shown in FIG. 5, the cover (24) is formed by three separate components. However, it is clear that at least one sheet-like component is required to perform the upper closure function of the enclosure (20) of the enclosed conveyor (10).

In the embodiments shown, the side walls (21, 22), the bottom plate (23) and the cover (24) are comprised of metal sheets.

Within the enclosure (20) at least one set of rollers (40) is arranged comprising a first inclined roller (41) mounted on the first side wall (21) and a second inclined roller (42) mounted on the second side wall (22).

In the embodiments shown, the module of the enclosed conveyor (10) is provided with two sets of rollers (40), each set of rollers (40) comprising two inclined rollers (41, 42) and a horizontal roller (43). In each set of rollers (40), a first inclined roller (41) is mounted on the first side wall (21), a second inclined roller (42) is mounted on the second side wall (22) and the horizontal roller (43) has one end mounted on the first side wall (21) and another end mounted on the second side wall (22).

In the embodiments shown, the inclined rollers (41, 42) are comprised of a cylindrical body (411, 421) provided with an shaft (412, 422) coupled at one end, while the horizontal roller (43) is comprised of a cylindrical body (431) equipped with shafts (432, 433) coupled at each end.

Notice that the module of enclosed conveyor (10) shown comprises two sets of rollers (40). However, it is possible to note that for the correct operation of the invention the enclosed conveyor must comprise at least one set of rollers (40), and the number of sets of rollers (40) to be used must be defined according to the convenience and need.

Figure 4:
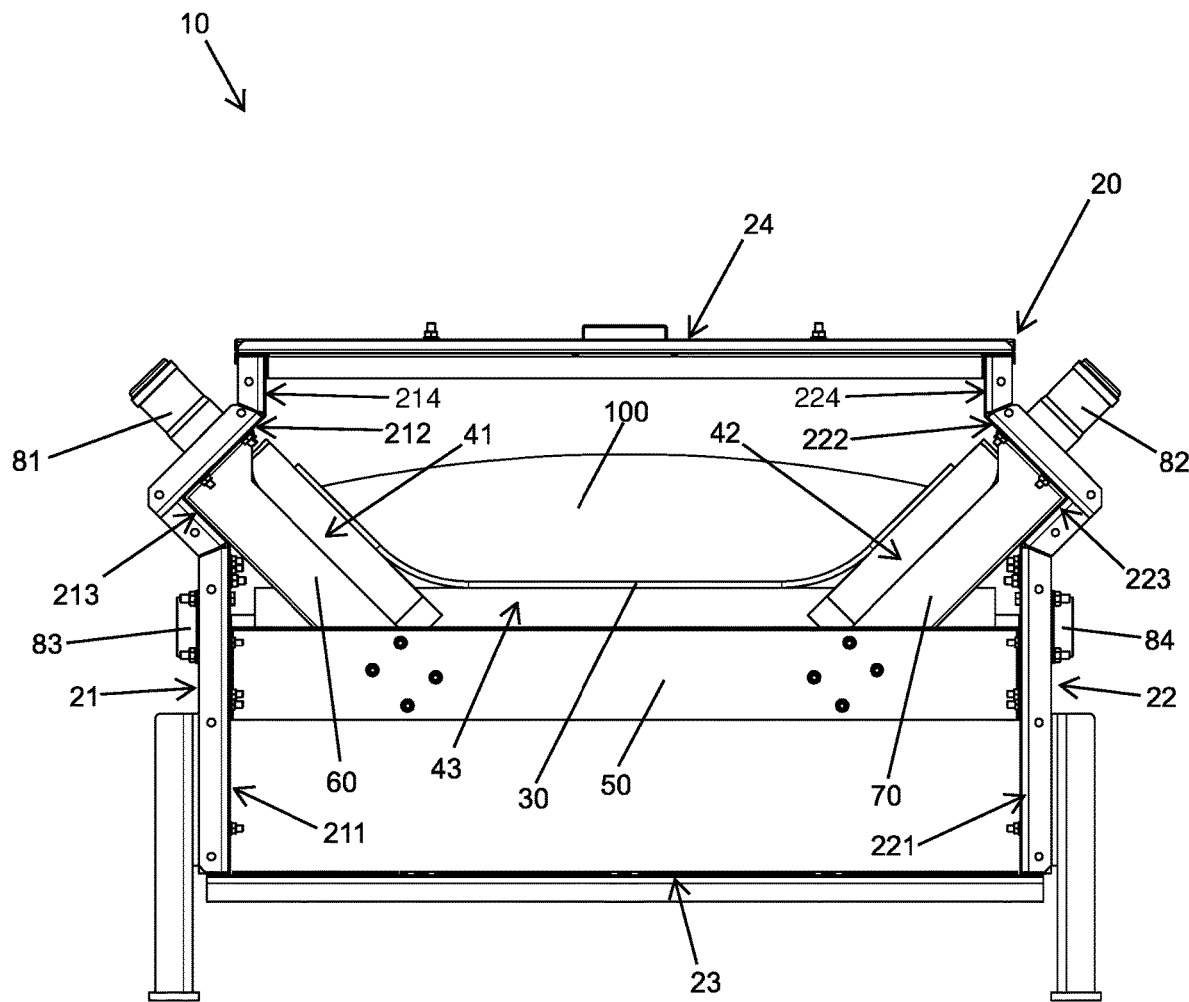
FIG. 4 shows a front view of the enclosed conveyor of the first embodiment of the invention without the representation of a horizontal beam, the inclined beams and the conveyor belt.

The enclosed conveyor (10) further comprises a conveyor belt (30) arranged over the set of rollers (40) so as to form a concave surface where a bulk material to be transported (100) is accumulated without the flow of said material (100) occurring along the sides of said conveyor belt (30), as can be seen in FIG. 4.

According to the invention, each side wall (21, 22) comprises a respective vertical section (211, 221) arranged over the bottom plate (23) and a respective support section (212, 222) inclined inwardly of the enclosure (20), each support section (212, 222) being inclined along an entire longitudinal extension of the respective side wall (21, 22), the first inclined roller (41) being mounted on at least part of the support section (212) of the first side wall (21) and the second inclined roller (42) being mounted in at least part of the support section (222) of the second side wall (22).

In other words, as can be seen in the embodiments shown, for each set of rollers (40) there is a first inclined roller (41) mounted on at least part of a first support section (212) of the first side wall (21) and a second inclined roller (42) mounted on at least part of a second support section (222) of the second side wall (22).

Advantageously, the side walls (21, 22) of the enclosed conveyor (10) comprise the support sections (212, 222) angled throughout all the longitudinal extension of the side walls (21, 22) in order to make the process of manufacturing said enclosed conveyor (10) easier and cheaper compared to the conventional enclosed conveyor.

Due to the arrangement of the support sections (212, 222) inclining across all the longitudinal extension of the side walls (21, 22), it is possible to manufacture said side walls (21, 22) with support sections (212, 222) that cooperates with the shafts (412, 422) of all inclined rollers (41, 42) of a module of an enclosed conveyor (10) by means of a single forming process.

Thus, in a single bending step of a metal sheet that forms one of the side walls of one of the enclosed conveyor modules, the support section is in all positions necessary for mounting the pillow blocks in one of the enclosed conveyor modules.

Thus, it is no longer necessary to manufacture the welded compartments for mounting the pillow blocks in an inclined manner, nor to weld said compartments on the side walls of a conventional enclosed conveyor, saving time and resources in the manufacture of said conveyor.

According to the first embodiment of the invention, as can be seen in FIGS. 1 to 4, each side wall (21, 22) comprises a respective connecting section (213, 223) inclined outwardly of the enclosure (20) and disposed between the respective vertical section (211, 221) and the respective support section (212, 222).

In other words, the first side wall (21) comprises a first connecting section (213) inclined outwardly of the enclosure (20) and disposed between the first vertical section (211) and the first support section (212), while the second side wall (22) comprises a second connecting section (223) inclined outwardly of the enclosure (20) and disposed between the second vertical section (221) and the second supporting section (222).

According to the first embodiment of the invention, the connecting section (213, 223) and the supporting section (212, 222) of the respective first and second side walls (21, 22) are shaped so as to have a cross section in the shape of an inclined "L".

Thus, it is possible to decrease the width of the bottom plate (23), which implies less material for the manufacture of the enclosed conveyor (10), without decreasing the width of the conveyor belt (30) and, consequently, decreasing the amount of bulk material to be transported (100).

According to the first embodiment of the invention, as shown in FIGS. 1 to 4, the support section (212) of the first side wall (21) has a hole for the passage of the shaft (412) of the first inclined roller (41), said shaft (412) cooperating with a first coupling set (81). The first coupling set (81) comprises a pillow block in its interior and is preferably fixed to the support section (212) of the first side wall (21) by means of screws.

In addition, according to the first embodiment of the invention, as shown in FIGS. 1 to 4, the support section (222) of the second side wall (22) has a hole for the passage of the shaft (422) of the second inclined roller (42), said shaft (422) cooperating with a second coupling set (82). The second coupling set (82) comprises a pillow block in its interior and is preferably fixed to the support section (222) of the second side wall (22) by means of screws.

Figure 7:
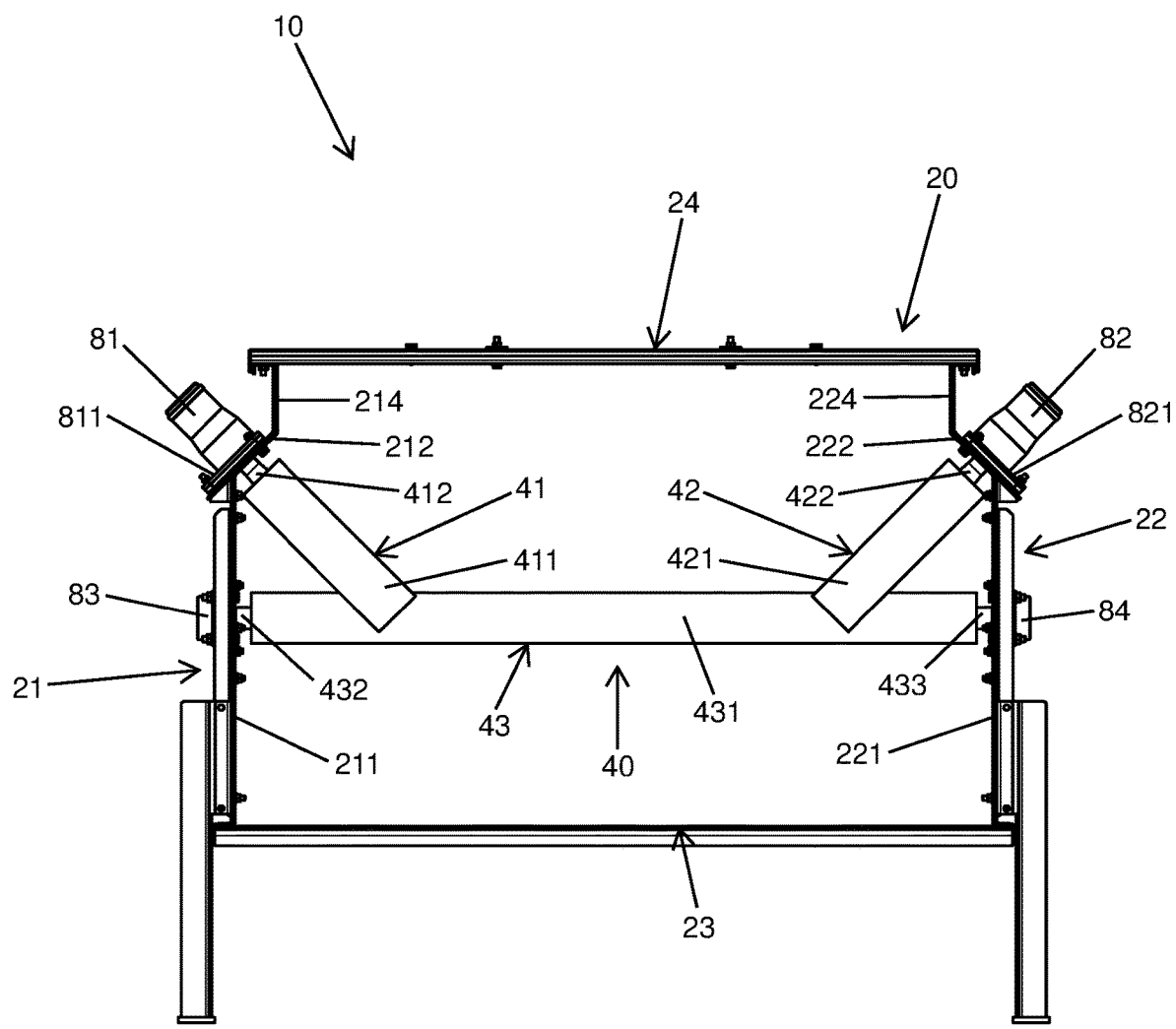
FIG. 7 shows a front view of the enclosed conveyor of the second embodiment of the invention without the representation of a horizontal beam, the inclined beams and the conveyor belt.
Figure 8:
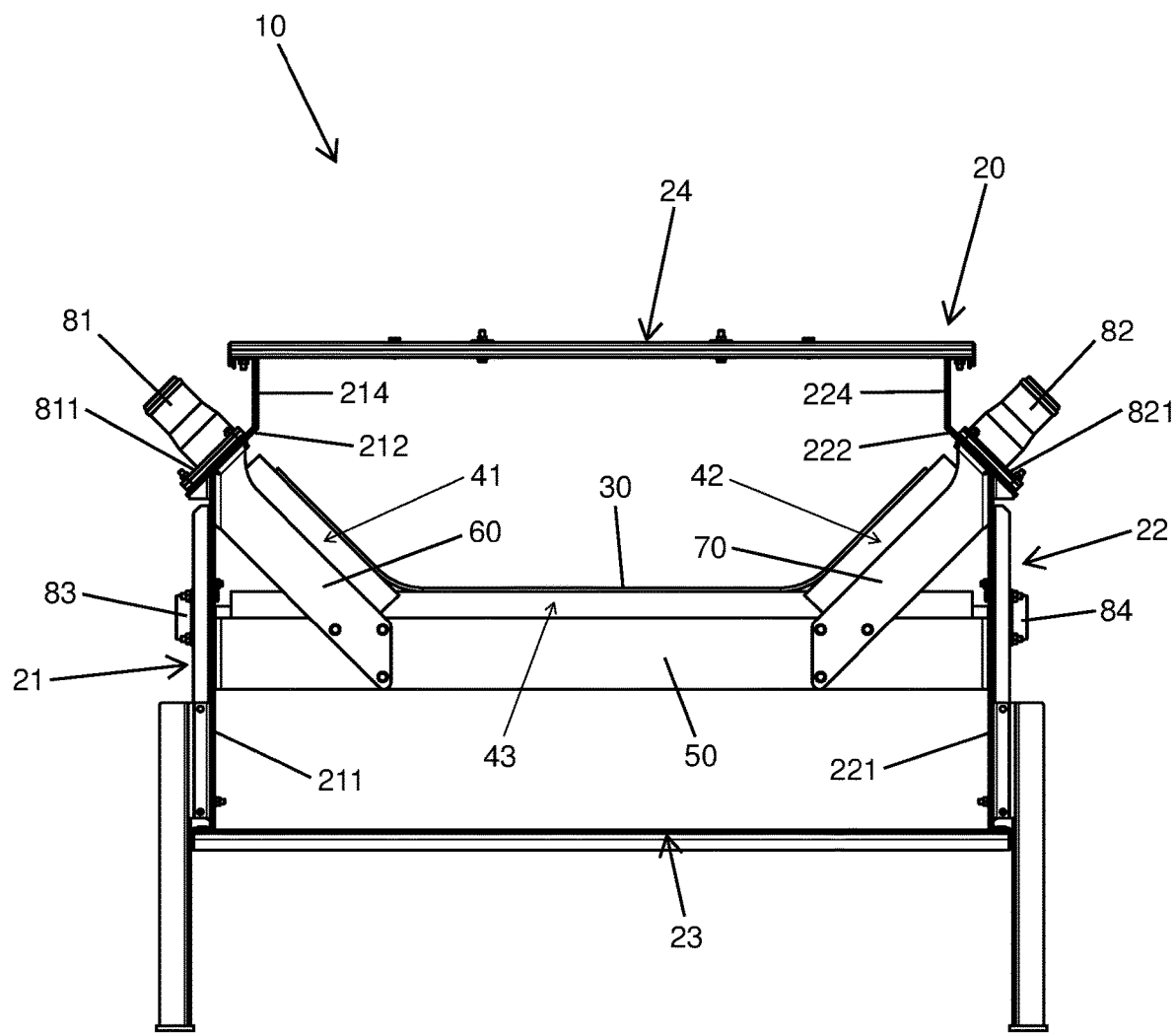
FIG. 8 shows a front view of the enclosed conveyor of the second embodiment of the invention with the representation of the horizontal beam, the inclined beams and the conveyor belt.

For example, each pillow block of each coupling set (81, 82) of each inclined roller (41, 42) is of the bearing pillow block type, and it can be configured, for example, as described and illustrated in FIG. 7 of U.S. Pat. No. 6,044,965, this being document incorporated herein by reference.

According to the second embodiment of the invention, as can be seen in FIGS. 5 to 11, each side wall (21, 22) has the support section (212, 222) extended directly from the respective vertical section (211, 221). In other words, the first side wall (21) has the first support section (212) extended directly from the first vertical section (211), while the second side wall (22) has the second support section (222) extended directly from the second vertical section (221). Each support section (212, 222) is formed by a folding process carried out on the sheet that forms each side wall (21, 22).

The configuration of the second incorporation has an advantage over the configuration of the first incorporation due to the fact that it eliminates surfaces susceptible to the accumulation of dust inside the enclosure (20) of the enclosed conveyor (10) from the bulk material to be transported (100). More particularly, an accumulation of dust can occur on the inner surface of the connecting section (213, 223) of the side walls (21, 22) of the enclosed conveyor (10) configured in accordance with the first embodiment of the invention.

According to the second embodiment of the invention, each coupling set (81, 82) of each inclined roller (41, 42) has a pillow block within it. For example, each pillow block is of the bearing pillow block type and can be configured, for example, as described and illustrated in FIG. 7 of U.S. Pat. No. 6,044,965, this document being incorporated by reference.

Figure 10:
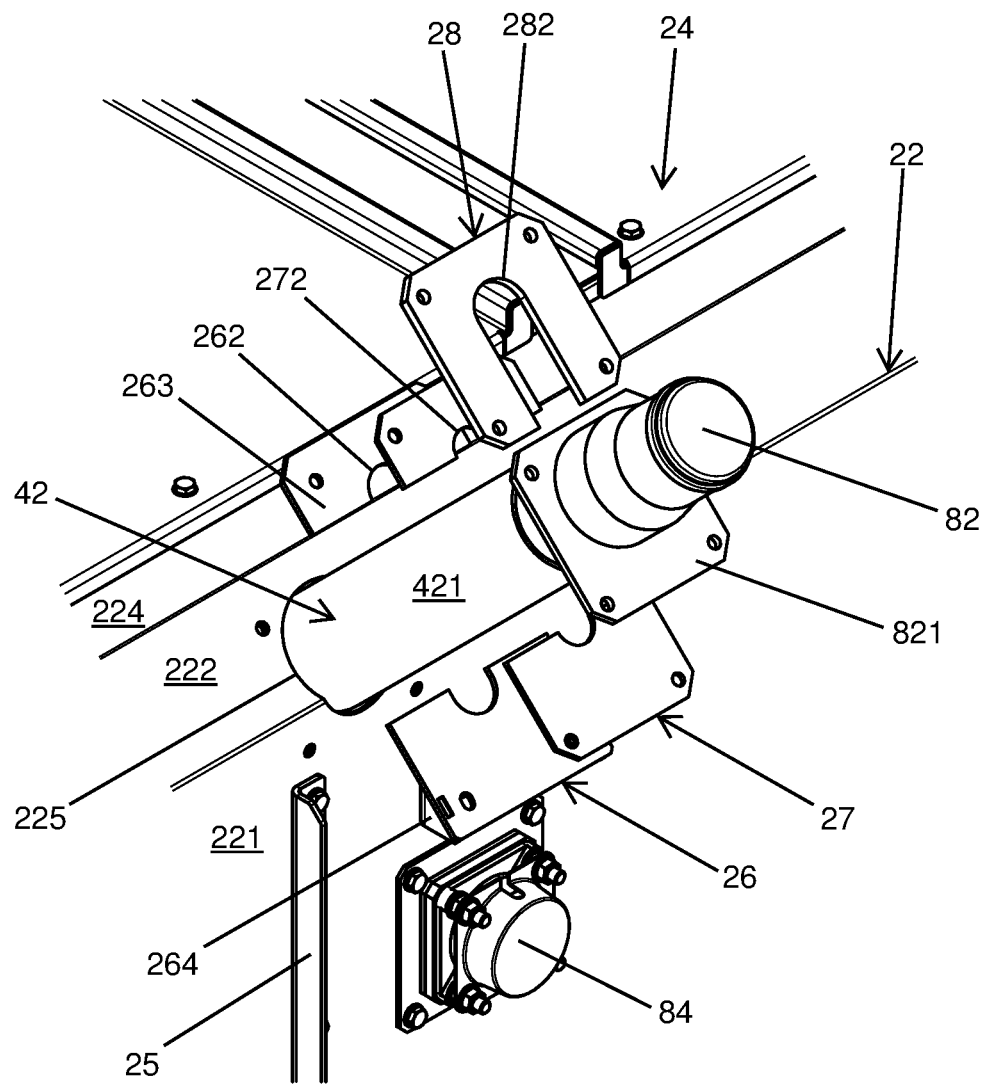
FIG. 10 shows an enlarged and partially exploded perspective view of a region of the enclosed conveyor of the second embodiment of the invention that includes a coupling set of an inclined roller coupling set.
Figure 11:
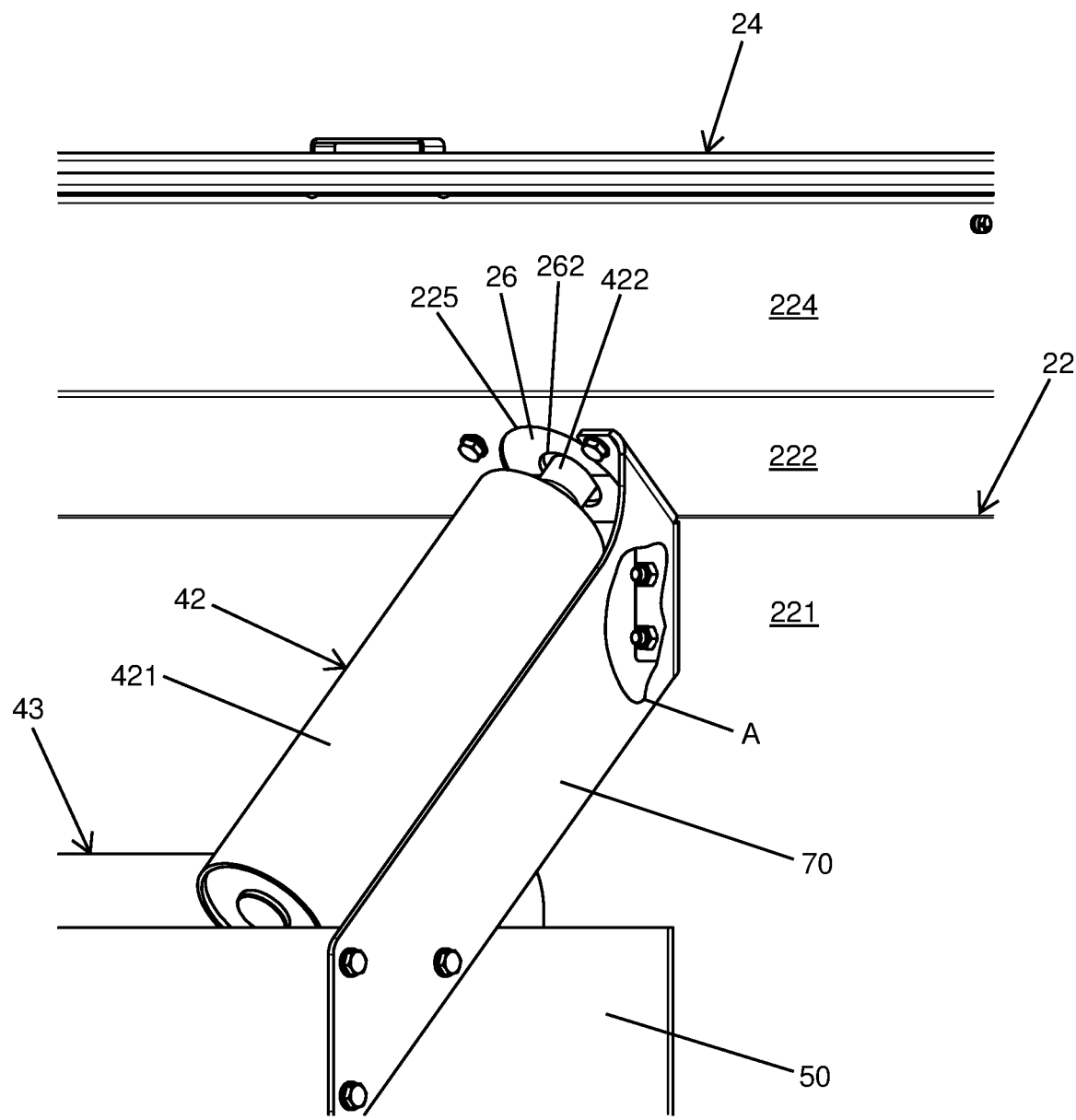
FIG. 11 shows an enlarged perspective view taken from inside the enclosure of the enclosed conveyor of the second embodiment of the invention and with an emphasis on an inclined roller, the "A" region being hidden to allow the visualization of the attachment of the inclined beam on the side wall.

According to the second embodiment of the invention, as shown in FIGS. 10 and 11, at least a part of each support section (212, 222), and preferably a part of each vertical section (211, 221), has a hole (225) suitable for the passage of the cylindrical body (411, 421) of a respective inclined roller (41, 42), each inclined roller (41, 42) having a shaft (412, 422) cooperating with a respective coupling set (81, 82) attached to the respective side wall (21, 22). In the embodiment shown, each hole (225) is located on a part of the support section (212, 222) and on a part of the vertical section (211, 221) of the respective side wall (21, 22). Alternatively, each hole (225) can be located integrally on the support section (212, 222) of the respective side wall (21, 22).

Figure 9:
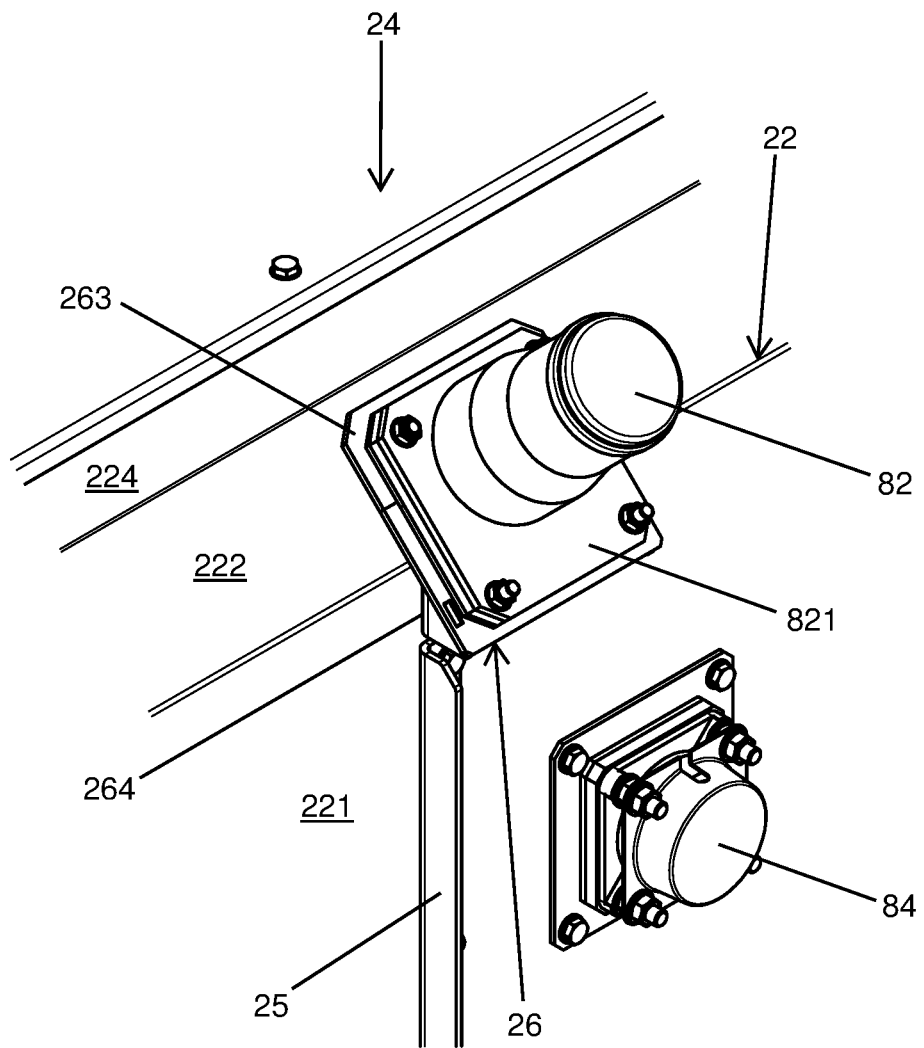
FIG. 9 shows an enlarged perspective view of a region of the enclosed conveyor of the second embodiment of the invention that includes a coupling set of an inclined roller.

Preferably, as can best be seen in FIGS. 9 to 11, each coupling set (81, 82) has a base wall (811, 821) for attachment to the respective side wall (21, 22), the attachment being carried out by means of a support (26) which has a portion cooperating with the support section (212, 222) and another portion cooperating with the vertical section (211, 221) of the respective side wall (21, 22), the support (26) having a hole (262) for passing the shaft (412, 422) of the respective inclined roller (41, 42), the support (26) being fixed to the respective side wall (21, 22) by means of screws, and the wall base (811, 821) of the respective coupling set (81, 82) being fixed to the respective support (26) by means of screws. Alternatively, the base wall (811, 821) of each coupling set (81, 82) can be coupled directly on the support section (212, 222) of the respective side wall (21, 22) by means of screws.

In the embodiment shown, as can best be seen in FIGS. 9 and 10, each support (26) is formed by a flat plate (263) with a region that rests on the support section (212, 222) of the respective side wall (21, 22) and a region that receives a bracket (264) in the shape of a right triangle defining a hypotenuse surface fixed on said flat plate (263) and a vertical cathetus surface that rests on the vertical section (211, 221) side wall (21, 22).

Preferably, as shown in FIGS. 10 and 11, each bracket (26) is split in order to divide the hole (262) of the shaft (412, 422) of the respective inclined roller (41, 42) in two parties.

Preferably, as shown in FIG. 10, each inclined roller (41, 42) receives a respective sealing plate (27) with a sealing hole (272) cooperating with the shaft (412, 422) of the respective inclined roller (41, 42). Preferably, each sealing plate (27) is coupled between the bracket (26) and the base wall (811, 821) of the respective coupling set (81, 82). Preferably, each sealing plate (27) is split in order to divide the sealing hole (272) into two parts. The sealing plate (27) seals around the shaft (412, 422) of the respective inclined roller (41, 41) separating the internal and external environment of the enclosure (20). Preferably, the sealing plate (27) is made of material with a low friction coefficient, such as, for example, ultra high molecular weight polyethylene (UHMW).

Preferably, as shown in FIG. 10, each inclined roller (41, 42) receives a respective spacer plate (28) attached between the sealing plate (27) and the base wall (811, 821) of the respective coupling set (81, 82), the spacer plate (28) having an opening (282) for the passage of the shaft (412, 422) of the respective inclined roller (41,42). Preferably, the opening (282) of each spacer plate (28) extends from a position aligned with the shaft (412, 422) of the respective inclined roller (41, 42) to a lower edge of the spacer plate (28). The spacer plate (28) is advantageous due to separating the pillow block base from each coupling set (81, 82) in relation to the respective side walls (21, 22) and, thus, mitigates the heat transfer from the pillow block to the interior of the enclosure (20). Preferably, the spacer plate (28) is made of low thermal conductivity material, such as, for example, ultra high molecular weight polyethylene (UHMW). The fact that the opening (282) of each spacer plate (28) extends to a lower edge of the spacer plate (28) is advantageous because it allows the exit of any excess lubrication from the pillow block of the respective coupling set (81, 82).

In addition, the fact that the bracket (26) and the sealing plate (27) are split and the fact that the spacer plate (28) has an opening (282) extended to its lower edge are advantageous because they allow each coupling set (81, 82) be pre-assembled on the shaft (412, 422) of the respective inclined roller (41, 42) prior to the assembly of each inclined roller (41, 42) on the respective side wall (21, 22). Once pre-assembly is carried out, the cylindrical body (411, 421) of the inclined roller (41, 42) is introduced through the hole (225) present in the support section (212, 222), and the bracket (26), the sealing plate (27) and the spacer plate (28) are mounted around the shaft (412, 422) of the inclined roller (41, 42). Then, the assembly is completed by proper attachment with screws.

In the embodiments shown, a first vertical section (211) of the first side wall (21) comprises a hole for the passage of one of the shafts (432) of the horizontal roller (43), said shaft (432) cooperating with a pillow block (83) fixed, preferably by screws, in said vertical section (211).

Similarly, a second vertical section (221) of the second side wall (22) comprises a hole for the passage of another shaft (433) of the horizontal roller (43), said shaft (433) cooperating with a pillow block (84) fixed, preferably by screws, in said vertical section (221).

Notice that the coupling sets (81, 82) that support the inclined rollers (41, 42) and the pillow blocks (83, 84) that support the horizontal roller (43) are arranged outside of the enclosure (20). Thus, it is ensured that the bearings of the coupling sets (81, 82) and of the pillow blocks (83, 84) do not have contact with the internal environment of the enclosure (20) of the enclosed conveyor (10) where the bulk material to be transported (100) is located.

In addition, in the embodiments shown, all pillow blocks are comprised of bearing pillow blocks, but other types of pillow blocks can be used, if convenient.

In an embodiment not shown, it is possible that the invention is used with rollers provided with inner sealed pillow blocks, so that the bearings of said sealed pillow blocks do not have contact with the internal environment of the enclosed conveyor enclosure. In this case, there is no need to drill holes for the roller shafts to pass, as the attachment of said rollers can be carried out inside the enclosure.

In the embodiments shown, each side wall (21, 22) has a respective complementary vertical section (214, 224) extended from the respective support section (212, 222). More particularly, the first side wall (21) has a first complementary vertical section (214) extended from the first support section (212), while the second side wall (22) has a second complementary vertical section (224) extended to from the second support section (222). The cover (24) is mounted on the complementary vertical sections (214, 224) of the side walls (21, 22).

In the embodiments shown, the enclosed conveyor (10) comprises a horizontal beam (50) with each end fixed to a vertical section (211, 221) of the side walls (21, 22), said horizontal beam (50) being arranged between the conveyor belt (30) and the bottom plate (23) of the enclosure (20).

In other words, one end of the horizontal beam (50) is attached to the first vertical section (211) of the first side wall (21) and the other end of said horizontal beam (50) is attached to the second vertical section (221) of the second side wall (22), the attachment of the ends being carried out, preferably, by means of screws. In addition, the horizontal beam (50) is arranged below the conveyor belt (30) and above the bottom plate (23) of the enclosure (20).

In this way, the horizontal beam (50) has the function of ensuring the structural stability of the enclosure (20) in the vertical sections (211, 221) of the side walls (21, 22). Therefore, it is guaranteed that the enclosure (22) does not suffer deformations or buckling by applying the loads inherent in the transport of the bulk material to be transported (100) in the region of the vertical sections of the side walls (21, 22).

In the embodiments shown, the enclosure (20) further comprises lateral reinforcements (25) arranged on the side walls (21, 22), in a region where the ends of the horizontal beam (50) are fixed on said side walls (21, 22).

Therefore, the lateral reinforcements (25) are fixed, by means of screws or by welding, on the side walls (21, 22) where the horizontal beam (50) is fixed. Notice that the lateral reinforcements (25) are intended to reinforce said side walls (21, 22) in the region where the horizontal beam (50) is fixed. Thus, the lateral reinforcements (25) can be fixed exactly in the same region of attachment of the ends of the horizontal beam (50), as well as in close regions where the ends of said horizontal beam (50) are fixed, as long as they perform the function to improve the resistance against deformation of the side walls (21, 22).

Notice also that if more than one horizontal beam (50) is used on the enclosed conveyor (10), lateral reinforcements (25) can be used on the side walls (21, 22) in any region where a horizontal beam (50) is fixed.

In the embodiments shown, the lateral reinforcements (25) are arranged outside the enclosure (20) of the enclosed conveyor (10), but they can also be arranged inside said enclosure (20).

In the embodiments shown, the enclosed conveyor (10) comprises a plurality of inclined beams (60, 70), one end of said inclined beams (60, 70) being fixed to one of the support sections (212, 222) of a side wall (21, 22) and with another end fixed to the horizontal beam (50).

In other words, the enclosed conveyor (10) comprises a first inclined beam (60) with one end fixed to the support section (212) of the first side wall (21) and with another end fixed to the horizontal beam (50), and a second inclined beam (70) with one end attached to the support section (222) of the second side wall (22) and with another end attached to the horizontal beam (50).

In the embodiment shown, the attachment of the inclined beams (60, 70) in the support sections (212, 222) of the side walls (21, 22) and in the horizontal beam (50) is carried out by means of a screw connection.

Notice that the inclined beams (60, 70) act together with the horizontal beam (50) to guarantee the structural stability of the enclosure (20) in the support section (212, 222) of the side walls (21, 22), preventing deformations from occurring in the enclosure (20) above the vertical sections (211, 221).

In addition, as in the embodiments shown, the coupling sets (81, 82) in which the inclined rollers (41, 42) cooperate can be screwed at the same points in the support sections (212, 222) where the inclined beams (60, 70) are fixed. In this way, it is guaranteed that there will be no plastic deformation in the support sections (212, 222) in a region around the coupling sets (81, 82), due to the increase in the mechanical resistance resulting from the positioning of the inclined beams (60, 70).

Figure 2:
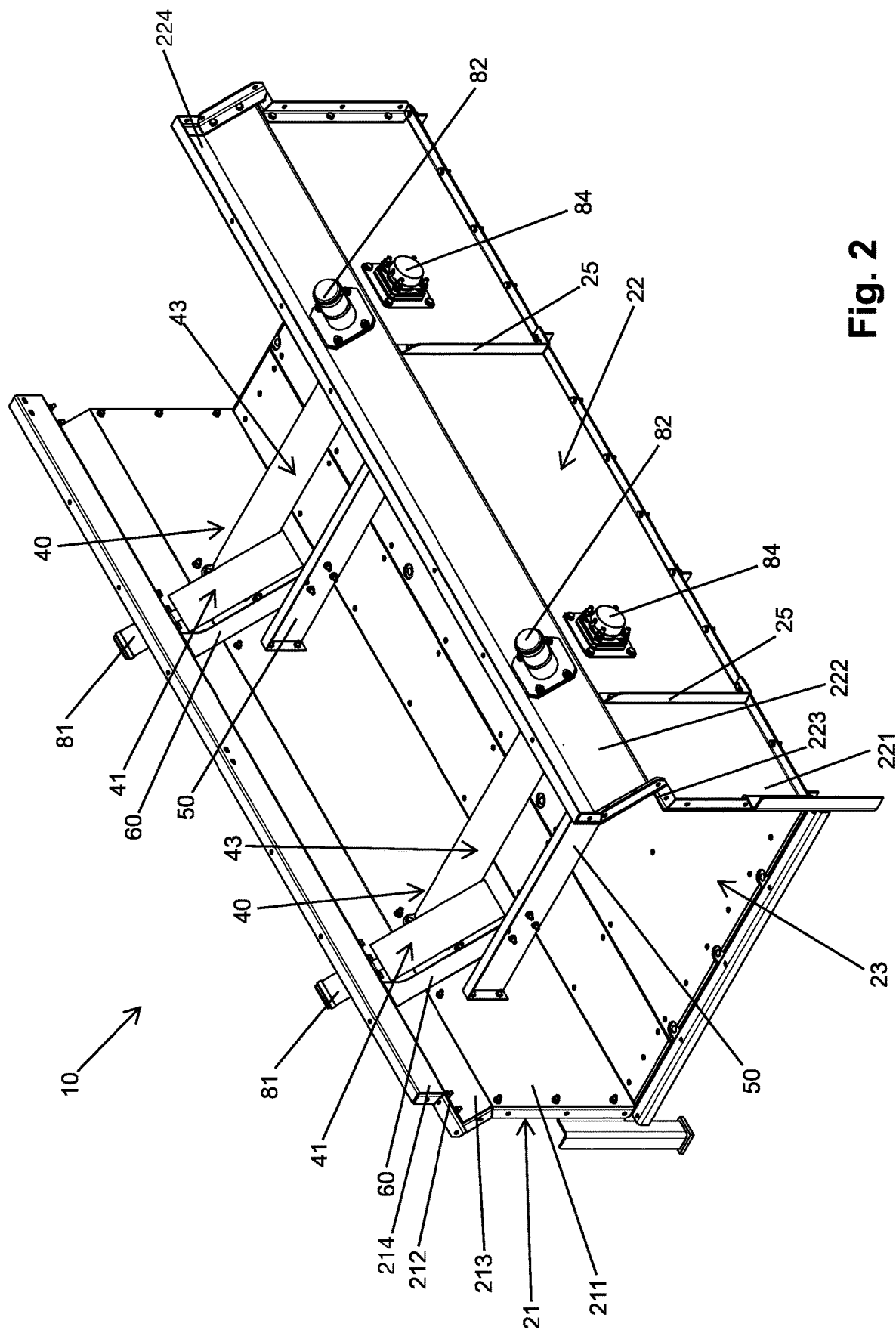
FIG. 2 shows a perspective view of the enclosed conveyor of the first embodiment of the invention without the representation of a cover and a conveyor belt.
Figure 3:
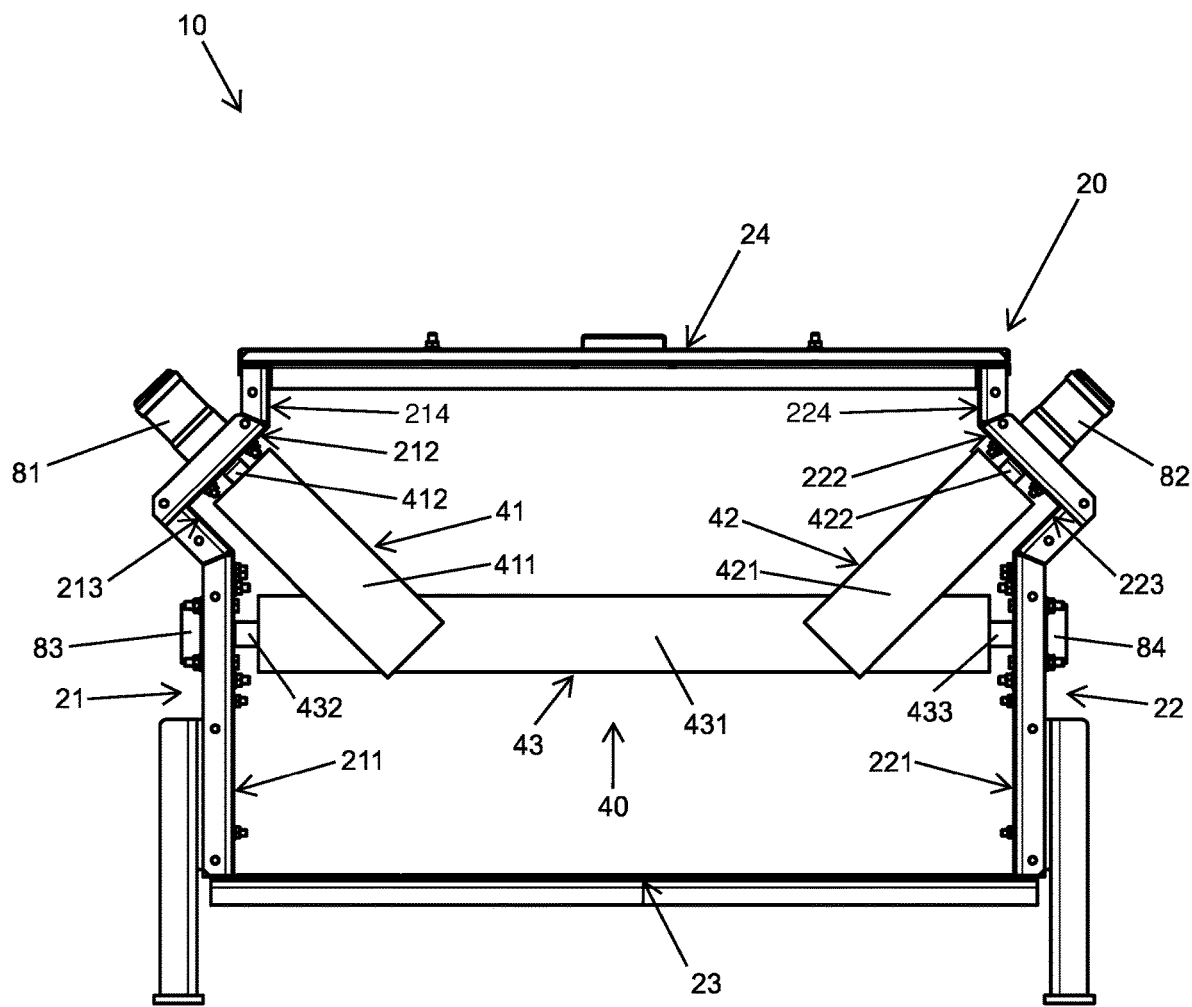
FIG. 3 shows a front view of the enclosed conveyor of the first embodiment of the invention without the representation of a horizontal beam, the inclined beams and the conveyor belt.

More particularly, each inclined beam (60, 70) can have its upper end attached only to the respective support section (212, 222) of the side walls (21, 22), as, for example, shown in FIGS. 2 and 4 of the first embodiment represented. Alternatively, each inclined beam (60, 70) can have its upper end fixed to the respective support section (212, 222) and the respective vertical section (211, 221) of the side walls (21, 22), such as, for example, can be seen in FIGS. 8 and 11 of the second embodiment shown.

Notice that in the embodiments shown, the module of the enclosed conveyor (10) comprises two horizontal beams (50) and two pairs of inclined beams (60, 70), in other words, a horizontal beam (50) and a pair of inclined beams (60, 70) for each set of rollers (40) used. However, it is possible to note that the enclosed conveyor (10) can comprise at least one horizontal beam (50) and at least one pair of inclined beams (60, 70), and the number of beams to be used must be defined accordingly with convenience and necessity.

In the embodiment shown, the inclined beams (60, 70) and the horizontal beam (50) are comprised of metal beams, but can be comprised of another material, provided that they perform the function of improving the structural stability of the enclosure (20) of the enclosed conveyor (10).

Alternatively, according to an embodiment not shown, the enclosed conveyor (10) can be configured without the use of horizontal beams (50) and inclined beams (60, 70). For example, alternatively, upper crossbars attached to the upper ends of the side walls (21, 22) could be used.

The preferred or alternative incorporations described here are not intended to limit the present invention to structural forms, and there may be constructive variations that are equivalent without, however, departing from the scope of protection of the invention.

The invention claimed is:

1. An enclosed conveyor comprising
   an enclosure formed by a first side wall and a second side wall arranged over a bottom plate and provided with a cover disposed over said side walls,
   at least one set of rollers comprising a first inclined roller mounted on the first side wall and a second inclined roller mounted on the second side wall,
   a conveyor belt arranged over the set of rollers,
   wherein each side wall comprises a respective flat vertical section arranged over the bottom plate and a respective flat support section inclined inwardly of the enclosure, each support section being inclined all along a longitudinal extension of the respective side wall, the first inclined roller being mounted in at least part of the support section of the first side wall and the second inclined roller being mounted in at least part of the support section of the second side wall.

2. The enclosed conveyor according to claim 1, comprising a horizontal beam with each end fixed in a vertical section of the side walls, said horizontal beam being arranged between the conveyor belt and the bottom plate of the enclosure.

3. The enclosed conveyor according to claim 2, comprising a plurality of inclined beams, one of the ends of said inclined beams being fixed in one of the support sections of a side wall and with the another end fixed to the horizontal beam.

4. The enclosed conveyor according to claim 1, wherein each side wall comprises a respective connecting section inclined outwardly of the enclosure and disposed between the respective vertical section and the respective support section.

5. The enclosed conveyor according to claim 1 wherein each side wall has the support section extended directly from the respective vertical section.

6. The enclosed conveyor according to claim 5, wherein at least one part of each support section, and part of each vertical section, has a hole suitable for the passage of the cylindrical body of a respective inclined roller, each inclined roller having a shaft cooperating with a respective coupling set attached to the respective side wall.

7. The enclosed conveyor according to claim 6, wherein each coupling set has a base wall for attachment to the respective side wall, the attachment being carried out by means of a support which has a cooperating portion with the support section and another cooperating portion with the vertical section of the respective side wall, the support having a hole for passing the shaft of the respective inclined roller, the support being fixed to the respective side wall by means of screws, and the base wall of the respective coupling set being fixed to the respective support by means of screws.

8. The enclosed conveyor according to claim 7, wherein each support is split in such a way as to divide the hole of the shaft of the respective inclined roller into two parts.

9. The enclosed conveyor according to claim 6, wherein each inclined roller receives a respective sealing plate with a sealing hole cooperating with the shaft of the respective inclined roller.

10. The enclosed conveyor according to claim 9, wherein each sealing plate is fixed between the support and the base wall of the respective coupling set.

11. The enclosed conveyor according to claim 9, wherein each sealing plate is split in order to divide the sealing hole into two parts.

12. The enclosed conveyor according to claim 10, wherein each inclined roller receives a respective spacer plate fixed between the sealing plate and the base wall of the respective coupling set, the spacer plate having an opening for passing the shaft of the respective inclined roller.

13. The enclosed conveyor according to claim 12, wherein the opening of each spacer plate is extended from a position aligned with the shaft of the respective inclined roller to a bottom edge of the spacer plate.

14. The enclosed conveyor according to claim 2, wherein the enclosure comprises lateral reinforcements arranged on the side walls in a region where the ends of the horizontal beam are fixed in said side walls.

15. An enclosed conveyor comprising
an enclosure formed by a first side wall and a second side wall arranged over a bottom plate and provided with a cover disposed over said side walls,
at least one set of rollers comprising a first inclined roller mounted on the first side wall and a second inclined roller mounted on the second side wall,
a conveyor belt arranged over the set of rollers,
wherein each side wall comprises a respective vertical section arranged over the bottom plate and a respective support section inclined inwardly of the enclosure, each support section being inclined all along a longitudinal extension of the respective side wall, the first inclined roller being mounted in at least part of the support section of the first side wall and the second inclined roller being mounted in at least part of the support section of the second side wall;
a horizontal beam with each end fixed in a vertical section of the side walls, said horizontal beam being arranged between the conveyor belt and the bottom plate of the enclosure; and
a plurality of inclined beams, one of the ends of said inclined beams being fixed in one of the support sections of a side wall and with the another end fixed to the horizontal beam.

16. An enclosed conveyor comprising
an enclosure formed by a first side wall and a second side wall arranged over a bottom plate and provided with a cover disposed over said side walls,
at least one set of rollers comprising a first inclined roller mounted on the first side wall and a second inclined roller mounted on the second side wall,
a conveyor belt arranged over the set of rollers,
wherein each side wall comprises a respective vertical section arranged over the bottom plate and a respective support section inclined inwardly of the enclosure, each support section being inclined all along a longitudinal extension of the respective side wall, the first inclined roller being mounted in at least part of the support section of the first side wall and the second inclined roller being mounted in at least part of the support section of the second side wall; and
wherein each side wall comprises a respective connecting section inclined outwardly of the enclosure and disposed between the respective vertical section and the respective support section.

* * * * *